June 24, 1930.    R. J. ANSCHICKS    1,767,642
TANK FITTING
Filed Sept. 10, 1928
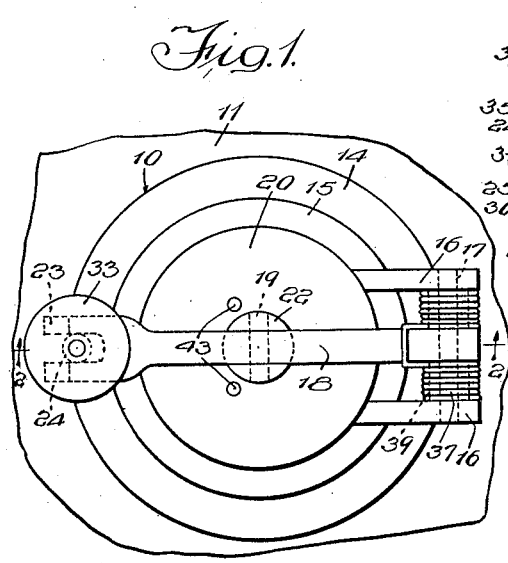
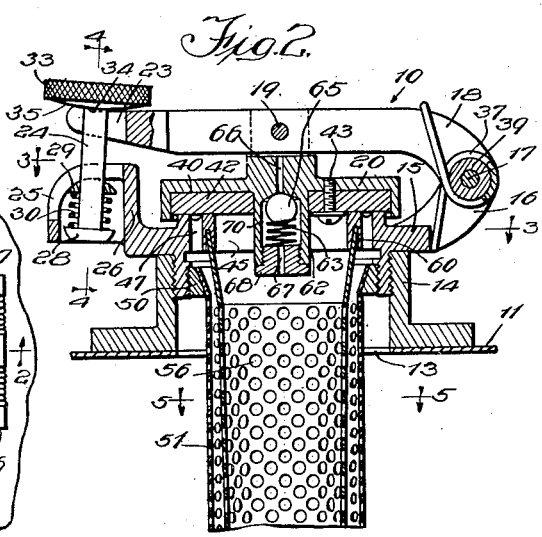
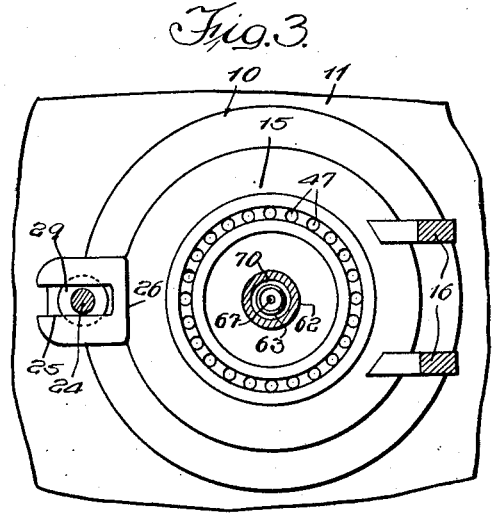
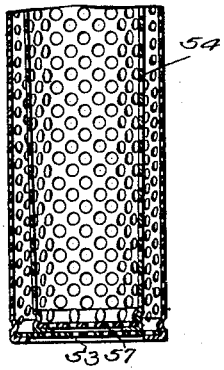
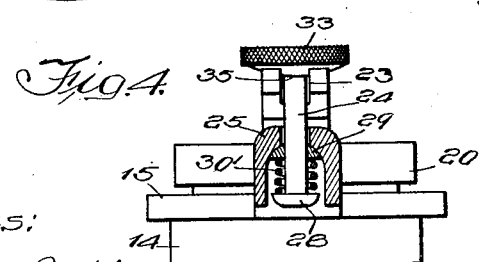
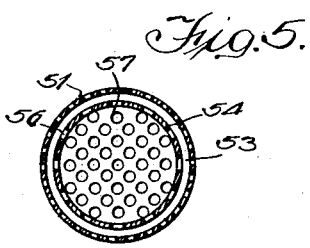
Inventor
Rudolph J. Anschicks
Hill & Hill Patented June 24, 1930

1,767,642

UNITED STATES PATENT OFFICE

RUDOLPH J. ANSCHICKS, OF CHICAGO, ILLINOIS, ASSIGNOR TO PROTECTOSEAL COMPANY OF AMERICA, OF CHICAGO, ILLINOIS, A CORPORATION OF ILLINOIS

TANK FITTING

Application filed September 10, 1928. Serial No. 305,087.

My invention relates to tank fittings and particularly to filling and venting devices for use upon receptacles adapted to hold volatile liquids.

A particular object of the invention is to provide an improved device of the kind described which, under ordinary conditions, permits the escape of gas from the receptacle when a predetermined pressure obtains therein and which may be quickly and easily adjusted to keep the receptacle sealed until a much higher pressure obtainers within the receptacle.

One form of the invention is embodied in a fitting adapted to be mounted in the filling opening of a tank, the improved fitting being preferably provided with means for preventing the propagation of flame from the exterior of the tank to the interior thereof and being preferably provided with means for relieving a partial vacuum developed in the tank. A closure member for the filling opening is held in its closed position by a spring adapted to yield when a predetermined pressure obtains in the tank and auxiliary means is provided which may be quickly and easily adjusted so that it will hold the closure member in its closed position until a much higher pressure obtains within the tank, the auxiliary means being preferably adapted to hold the closure member in its closed position when the tank is being transported over rough roads, or the like.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a plan view of a tank fitting embodying my invention, the fitting being shown in connection with a fragmentary portion of the tank;

Fig. 2 is a section taken on line 2—2 of Fig. 1;

Fig. 3 is a section taken on line 3—3 of Fig. 2;

Fig. 4 is a section taken on line 4—4 of Fig. 2; and

Fig. 5 is a section taken on line 5—5 of Fig. 2.

In the drawings, I have shown a preferred form of the invention embodied in a combined filling and venting device which is particularly adapted to be mounted upon tractor tanks, tank wagons, or other vehicles, but it is to be understood that the invention is limited to this use only to the extent indicated in the appended claims.

The improved fitting is designated generally by the reference character 10 and is shown in connection with a tank 11, only a portion of which is shown in the drawing. The tank 11 is assumed to be one of the kind generally provided upon tractor tanks which are employed for holding gasoline, naphtha, or other volatile liquids. The fitting 10 is preferably removably secured to the tank 11 at a filling opening 13 provided in the tank. As shown, a collar 14, or the equivalent, is preferably secured to the tank at its filling opening 13, the collar being arranged concentrically with the opening. Screw-threaded into the collar 14 is an annular member 15 which is preferably provided with integral lugs 16. A pin 17 carried by the lugs 16 pivots a lever 18 and a pin 19 carried by the lever 18 intermediate its ends pivots a closure member or cap 20, the cap 20 being provided with an upwardly extending bifurcated boss 22 through which the pin 19 passes. The free end of the lever 18 is bifurcated as illustrated at 23 to receive a locking bolt or pin 24 which is movably mounted in a slot 25 provided in a lug 26, the lug 26 being preferably formed integral with the annular member 15. If desired, the bifurcated ends of lever 23 may be apertured to admit a lock for preventing unauthorized tampering with the tank contents. The lower end of the locking bolt or pin 24 terminates in a head 28 and interposed between the head and a washer 29 slidably journaled on the pin is a compression spring 30. The upper end of the locking bolt or pin 24 is preferably provided with a knurled disk 33 whereby an attendant may bring the locking bolt or pin into and out of engagement with the bifurcated end 23 of the lever 18. It will be noted that the bifurcations provided in the free end of the lever 18 are preferably provided with relatively shallow notches 34 in their upper surfaces, which notches 34 are engageable with a conical surface 35 formed upon the disk 33, the construction being such that when the locking bolt or pin 24 is in the position wherein it is shown in Fig. 2, the spring 30 tends to hold the conical surface 35 in engagement with the notches 34 so that the bolt or pin will not be accidentally displaced relative to the lever 18.

A helical spring 37 wound upon hubs 39 provided upon the lever 18 normally holds the closure member or cap 30 in its closed position. The cap is preferably provided with an annular recess 40 in its bottom surface and seated in this recess is a gasket 42 which is preferably formed from leather, or the equivalent. Screws 43, or the equivalent, are preferably provided for securing the gasket 42 to the cap 20. When the cap is in its closed position, the gasket 42 engages the upper surface of the annular member 15 and effectively seals the filling opening 45 formed in the annular member. The leather gasket 42 is also adapted to close the upper ends of a plurality of vents or apertures 47 provided in the annular member 15, the vents or apertures 47 being preferably located in a circle around the filling opening 45. Screw-threaded into the lower end of the annular member 15 is a ring 50 to which the upper end of a foraminous tube 51 is rigidly secured. In the illustrated embodiment of the invention, the tube 51 is preferably provided with the flame-proof apertures throughout its length and its bottom end is preferably closed by a plate 53 which is also provided with flame-proof apertures. Disposed within the tube 51 and arranged concentrically therewith is a foraminous tube 54 which is preferably made of heavier sheet metal than the foraminous tube 51. The foraminous tube 54 is preferably provided with apertures 56 which are larger than the flame-proof apertures provided in the foraminous tube 51. The lower end of the tube 54 is preferably closed by a perforate disk 57 and it will be noted that the lower end of the tube 54 rests upon the foraminous plate 53, the upper end of the foraminous tube 54 being preferably disposed in an annular groove 60 formed in the annular member 15.

It is readily understood that the flame-proof apertures provided in the foraminous tube 51 permit liquid to flow from the tube into the interior of the tank 11 and permit gas to flow from the tank up through the annular space provided between the tubes 51 and 54. As shown, the annular space or passage provided between the tubes 51 and 54 is aligned with the vents or apertures 47 so that when the gasket 42 is disengaged from the annular member 15, gas may flow from the annular space up through the vents or apertures 47 into the atmosphere. As hereinbefore set forth, the tube 54 is of relatively heavy construction and it is obvious that it protects the tube 51 from injury when filling nozzles, or the equivalent, are introduced into the tank through the filling opening 45.

Projecting downwardly from the bottom surface of the cap 20 is a boss 62 provided with a valve chamber 63 in which a ball valve 65 is disposed, the ball valve 65 being adapted to engage a conical valve seat formed within the chamber. The upper end of the chamber 63 communicates through a port 66 with the atmosphere and the lower end of the chamber communicates with the interior of the tank through a port 67 provided in a nut 68 which is screw-threaded into the boss 62 and closes the lower end of the chamber. A compression spring 70 interposed between the ball valve 65 and the nut 68 tends to hold the ball in engagement with the valve seat 66 so that the chamber 63 does not communicate with the atmosphere through the port 66. Obviously, the nut 68 may be manipulated to adjust the tension of the spring 70. The arrangement is such that if a partial vacuum is developed in the tank, atmospheric pressure acting upon the ball valve 65 through the port 66 will unseat it and permit air to flow through the tank.

In practice, the springs 30 and 37 are designed to permit the closure member 20 to be lifted out of its closed position when a predetermined pressure obtains within the tank 11, the bolt 24 moving against the spring 30. The spring 30 serves as auxiliary means to the spring 37 for retaining the closure member in place and preventing chattering thereof when the vehicle is traveling over rough roads. As shown in Fig. 2, the bolt 24 serves as a retaining member so that the splashing of the liquid in the tank will not cause displacement of the closure member relative to the annular member 15. This, of course, prevents a loss of any of the contents of the tank while it is being transported. When a predetermined pressure obtains within the tank the closure member is raised against the action of springs 30 and 37 to relieve the pressure.

Having thus described my invention, it is obvious that various immaterial modifications may be made in the same without departing from the spirit of my invention; hence I do not wish to be understood as limiting myself to the exact form, construc- tion, arrangement and combination of parts herein shown and described, or uses mentioned.

What I claim as new and desire to secure by Letters Patent is:

1. In a device of the class described, an annular member adapted to be seated in a filling opening of a tank or the like, a closure member pivotally mounted on said annular member and adapted to be unseated upon the exertion of a predetermined pressure within said tank, means on said closure member for relieving a vacuum within said tank, and releasable means for yieldably retaining said closure member in closing engagement with said annular member.

2. In a device of the class described, an annular member adapted to be seated in a filling opening of a tank or the like, a closure member pivotally mounted on said annular member and adapted to be unseated upon the exertion of a predetermined pressure within said tank, valve means on said closure member for relieving a vacuum within said tank, and releasable means for yieldably retaining said closure member in engagement with said annular member.

3. In a device of the class described, an annular member adapted to be seated in a filling opening of a tank or the like, a lever pivoted on said annular member and extending diametrically thereover, a closure member pivoted on said lever and removably seated on said annular member, means for yieldably retaining said closure member in engagement with said annular member, and releasable means engaging said lever for yieldably retaining said closure member in engagement with said annular member.

4. In a device of the class described, an annular member adapted to be seated in a filling opening of a tank or the like, a lever pivoted on said annular member and extending diametrically thereover, a closure member pivoted on said lever and removably seated on said annular member, means in said closure member for relieving a vacuum within said tank, means for yieldably retaining said closure member in engagement with said annular member, and auxiliary releasable means for retaining said closure member in engagement with said annular member, said auxiliary member being yieldable when a predetermined pressure obtains within the tank.

5. In a device of the class described, an annular member having a slotted lug projecting from one side thereof, a lever pivoted on the diametrically opposite side thereof, a closure member pivotally carried by said lever and removably seated on said annular member, a member movably carried by said slotted lug and releasably engaging said lever, and resilient means for retaining said member in engagement with said lever and permitting said closure member to become unseated when a predetermined pressure is applied thereon.

6. In a device of the class described, an annular member having a slotted lug projecting from one side thereof, a lever pivoted on the diametrically opposite side thereof, a closure member pivotally carried by said lever and removably seated on said annular member, means for yieldably retaining said closure member in engagement with said annular member, auxiliary releasable retaining means movably carried by said slotted lug and releasably engaging said lever, and resilient means for retaining said auxiliary means in engagement with said lever.

7. In a device of the class described, an annular member having a slotted lug projecting from one side thereof, a lever pivoted on the diametrically opposite side thereof, a closure member pivotally carried by said lever and removably seated on said annular member, said lever having a bifurcated end with a notched face, a bolt movably carried by said slotted lug and having at one end a disk with a conical base engageable with the notch in the bifurcated end of said lever for releasably retaining said closure member in engagement with said annular member, and resilient means for retaining said bolt in engagement with said lever.

In testimony whereof, I have hereunto signed my name.

RUDOLPH J. ANSCHICKS.